United States Patent
Blaskovich et al.

(10) Patent No.: US 7,278,826 B2
(45) Date of Patent: Oct. 9, 2007

(54) AIRFOIL COOLING PASSAGE TRAILING EDGE FLOW RESTRICTION

(75) Inventors: Timothy Blaskovich, Montreal (CA); Larry Lebel, Sherbrooke (CA); Ricardo Trindade, Coventry, CT (US)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 160 days.

(21) Appl. No.: 10/920,374

(22) Filed: Aug. 18, 2004

(65) Prior Publication Data

US 2006/0039786 A1 Feb. 23, 2006

(51) Int. Cl.
*F01D 5/08* (2006.01)
(52) U.S. Cl. .............. 416/97 R; 29/889.2; 164/369
(58) Field of Classification Search .............. 416/97 R; 415/115; 29/889.721; 164/369, 397
See application file for complete search history.

(56) References Cited

U.S. PATENT DOCUMENTS

| | | | |
|---|---|---|---|
| 3,767,322 A | 10/1973 | Durgin et al. | |
| 4,025,226 A | 5/1977 | Hovan | |
| 4,056,332 A | 11/1977 | Meloni | |
| 4,312,624 A | 1/1982 | Steinbauer, Jr. et al. | |
| 4,437,810 A | 3/1984 | Pearce | |
| 4,526,512 A | 7/1985 | Hook | |
| 5,125,798 A | 6/1992 | Muth et al. | |
| 5,243,759 A * | 9/1993 | Brown et al. | 29/889.721 |
| 5,337,805 A * | 8/1994 | Green et al. | 164/369 |
| 5,511,937 A | 4/1996 | Papageorgiou | |
| 5,599,166 A * | 2/1997 | Deptowicz et al. | 416/97 R |
| 5,975,851 A * | 11/1999 | Liang | 416/97 R |
| 6,126,396 A * | 10/2000 | Doughty et al. | 416/97 R |
| 6,499,949 B2 | 12/2002 | Schafrik et al. | |
| 6,551,063 B1 | 4/2003 | Lee et al. | |
| 6,637,500 B2 * | 10/2003 | Shah et al. | 164/369 |

* cited by examiner

*Primary Examiner*—Ninh H. Nguyen
(74) *Attorney, Agent, or Firm*—Ogilvy Renault LLP

(57) ABSTRACT

An internal metering structure permits the exit apertures of a cooled airfoil to be sized to provide for easy manufacturability.

16 Claims, 3 Drawing Sheets

AIRFOIL COOLING PASSAGE TRAILING EDGE FLOW RESTRICTION

TECHNICAL FIELD

The invention relates to internally cooled airfoils for gas turbine engines.

BACKGROUND OF THE ART

It is difficult to appropriately size the trailing edge orifices of an internally cooled airfoil in order to efficiently meter the flow of cooling air leaving the airfoil. The difficulty of metering the air principally arises because of manufacturing constraints. For example, internally cooled airfoils are typically cast using a ceramic core, and a minimum core thickness (about 0.020 inch) must usually be maintained to prevent core breakage upon removal. It is therefore difficult to provide an airfoil requiring a less than 0.020 inch orifice size. An oversize orifice, however, result in wasted cooling air efficiency.

Accordingly, there is a need to provide a new airfoil cooling flow metering device which addresses these and other limitations of the prior art.

SUMMARY OF THE INVENTION

It is therefore an object of this invention to provide a new flow control device which facilitates manufacturability of a cooled airfoil.

In one aspect, the present invention provides an airfoil for a gas turbine engine, the airfoil comprising an airfoil body having an internal cooling path and at least one exit aperture through which cooling air leaves the airfoil, and wherein the flow of cooling air through said at least one exit aperture is metered restricted immediately upstream of said at least one aperture by at least one flow metering orifice integral to said airfoil.

In a second aspect, the present invention provides a cooled gas turbine engine airfoil comprising a hollow body defining an internal cooling path through which a cooling fluid is circulated to convectively cool the airfoil, at least one exit aperture through which the cooling fluid leaves the airfoil, the flow of cooling air leaving the airfoil being metered by a series of metering orifices defined in a rib structure extending across the cooling path immediately upstream of said at least one exit aperture, wherein the rib structure and the hollow body are of unitary construction.

In a third aspect, the present invention provides a casting core for use in the manufacturing of a hollow gas turbine engine airfoil, comprising a solid body adapted to be used for forming an internal geometry of an airfoil having an internal cooling path, a row of primary apertures defined through said solid body, each pair of adjacent primary apertures being spaced by a primary rib forming a corresponding metering aperture in the gas turbine engine airfoil, and a row of secondary apertures through said solid body, each pair of adjacent secondary apertures being spaced by a secondary rib forming a corresponding exit aperture in a trailing edge region of the gas turbine engine airfoil, and wherein the primary ribs are smaller in size than said secondary ribs and said primary ribs are immediately upstream of said secondary ribs.

In a fourth aspect, the present invention provides a method of method of making an internally cooled airfoil, comprising the steps of: providing an airfoil having an internal cooling path terminating in at least one exit aperture, providing said exit aperture in a size which permits satisfactory manufacturability, providing a metering rib immediately upstream of the exit aperture with at least one orifice, the orifice sized to restrict the flow delivered to the exit aperture to thereby control the overall airflow exiting the airfoil.

Further details of these and other aspects of the present invention will be apparent from the detailed description and Figures included below.

DESCRIPTION OF THE DRAWINGS

Reference is now made to the accompanying Figures depicting aspects of the present invention, in which.

DETAILED DESCRIPTION OF PREFERRED EMBODIMENTS

Figure 1:
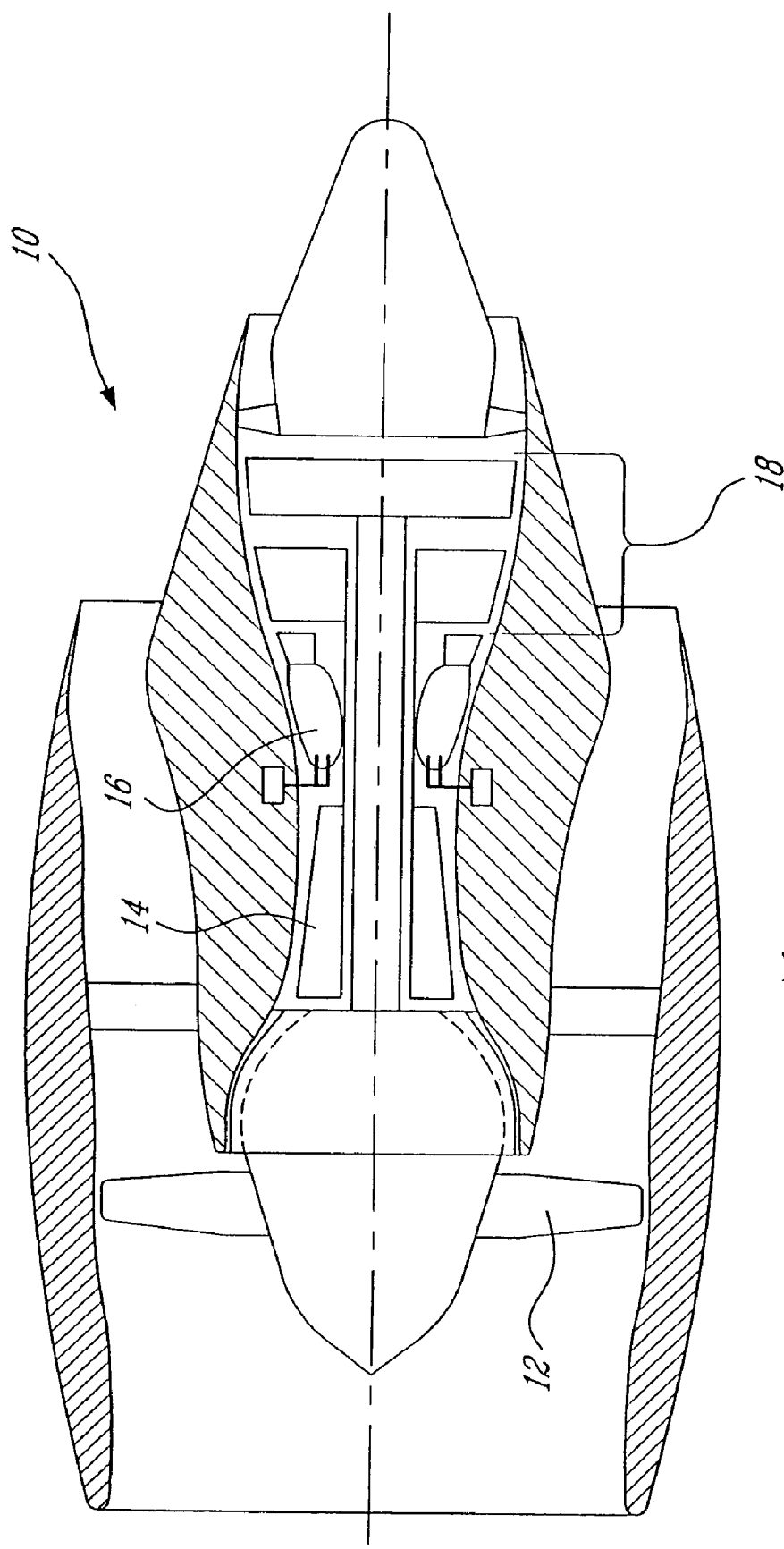
FIG. 1 is a schematic side view of a gas turbine engine, in partial cross-section, to which an embodiment of the present invention is applied.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
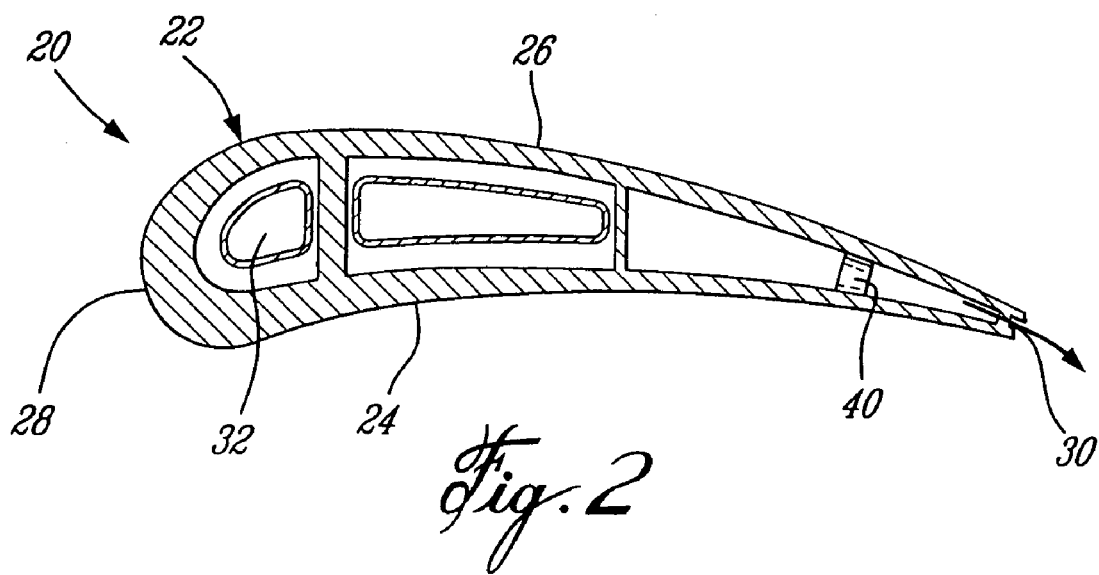
FIG. 2 is a cross-sectional end view of an internally cooled airfoil of the gas turbine engine shown in FIG. 1.

The turbine section 18 comprises one or more stages of stationary vanes and rotating blades. The present invention is applicable to either one of these types of airfoil, one of which is generally designated by numeral 20 in FIG. 2.

Figure 3:
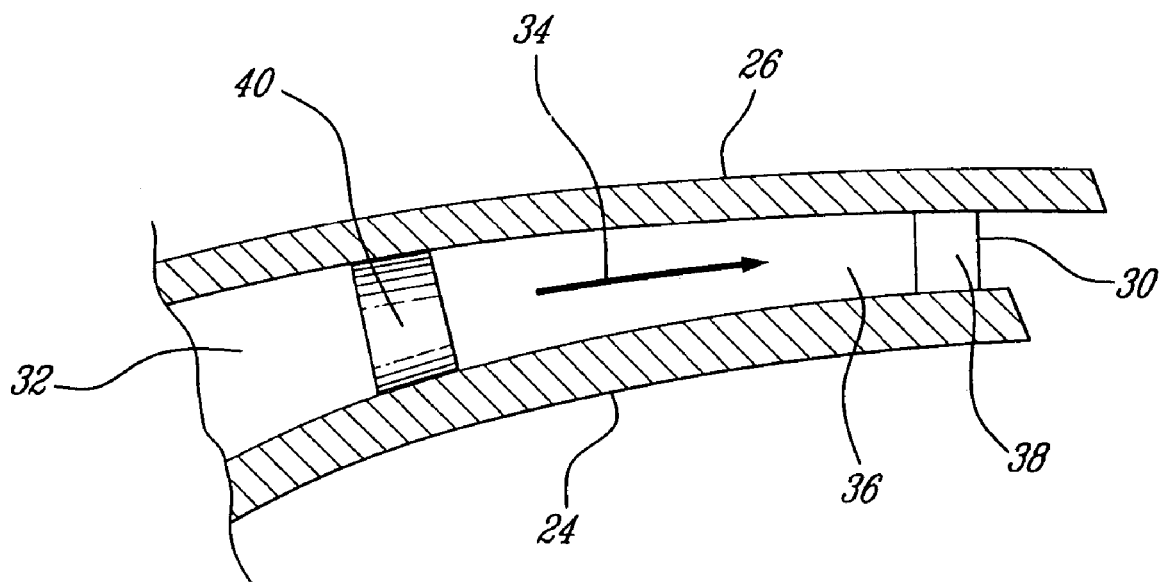
FIG. 3 is an enlarged cross-sectional end view of a trailing edge portion of the hollow airfoil in accordance with an embodiment of the present invention.

The airfoil 20 comprises a hollow airfoil body 22 over which flows hot combustion gases emanating from the combustor 16. The hollow airfoil body 22 generally comprises a pressure side wall 24 and a suction side wall 26 joined together at longitudinally extending leading and trailing edges 28 and 30. The hollow airfoil body 22 defines between the pressure side wall 24 and the suction side wall 26 an internal cooling path 32 through which cooling air flows to convectively cool the airfoil 20, as depicted by arrows 34 in FIGS. 3 and 4. The cooling air is typically discharged from the airfoil trailing edge 30 into the main gas path of the engine 10 via a plurality of exit apertures 36 defined at selected longitudinally spaced-apart locations through the trailing edge 30 of the airfoil 20. It is understood however that the exit apertures 36 could be provided at other locations in the airfoil 20. Also a single elongated exit slot could be used in place of the above described discrete exit apertures 30

Each pair of adjacent exit apertures 36 are spaced from one another by a strut or a pedestal 38 extending integrally from an inner surface of the pressure side wall 24 to an inner surface of the suction side wall 26. The pedestals 38 interconnect the pressure and suction side walls 24 and 26 at the trailing edge region of the airfoil 20.

Figure 4:
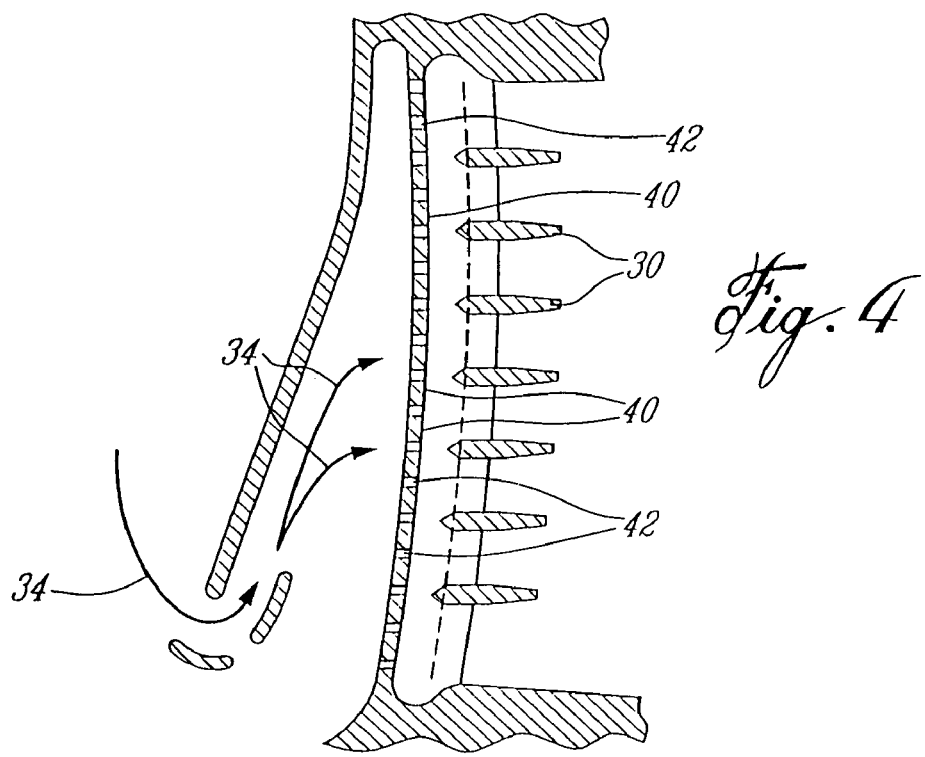
FIG. 4 is a cross-sectional plan view of the trailing edge portion of the airfoil shown in FIG. 2.

As best shown in FIG. 4, a series of longitudinally spaced-apart ribs 40 are provided across the cooling path 32 in the trailing edge region of the airfoil 20 slightly upstream of the exit apertures 36. The ribs 40, which could also be viewed as a single segmented rib, extend integrally between the pressure side surface 24 and the suction side surface 26 of the airfoil 20. Each pair of adjacent ribs 40 define therebetween an orifice 42 sized to be smaller than the trailing edge exit apertures 36 to meter the flow of cooling air discharged through the exit apertures 36. In this way, the flow of cooling air leaving the airfoil 20 can be advantageously controlled irrespective of the size of the trailing edge exit apertures 36. Accordingly, the trailing edge exit apertures 36 can be sized to permit easy manufacturability, rather than cooling flow control, since cooling flow control is provided by the orifices 42 between the ribs 40 in the cooling path 32 upstream of the exit apertures 36.

In use, cooling air or another appropriate cooling fluid is directed into one end of the hollow airfoil 20 and caused to flow along the internal cooling path 32 to convectively cool the pressure and suction side surfaces 24 and 26. The orifices 42 are appropriately sized to provide overall control of the flow of cooling air leaving the airfoil 20 upstream of the exit apertures 36. Thus, the designer does not need to rely on exit apertures 36 to perform any flow metering or control function, thereby allowing the size of exit apertures 36 to be optimized for manufacturability rather than flow control. Larger exit apertures make manufacturing easy, and thus tend to reduce costs. The cooling air discharged from the airfoil 20 via the exit apertures 36 is typically directed into the main gas path of the engine 10. While just about all structures (ribs, pedestals, trip strips, etc.) in the internal flow path restrict the flow in some respect, and thus could be said to "meter" the flow, such metering effect is extremely difficult to control in practice, and thu it is of great benefit to provide a means by which the "final" overall flow through the internal path can be controlled. The present invention provides such means independent of the final exit aperture of the path, and therefore greatly improves flexibility available in design.

Figure 5:
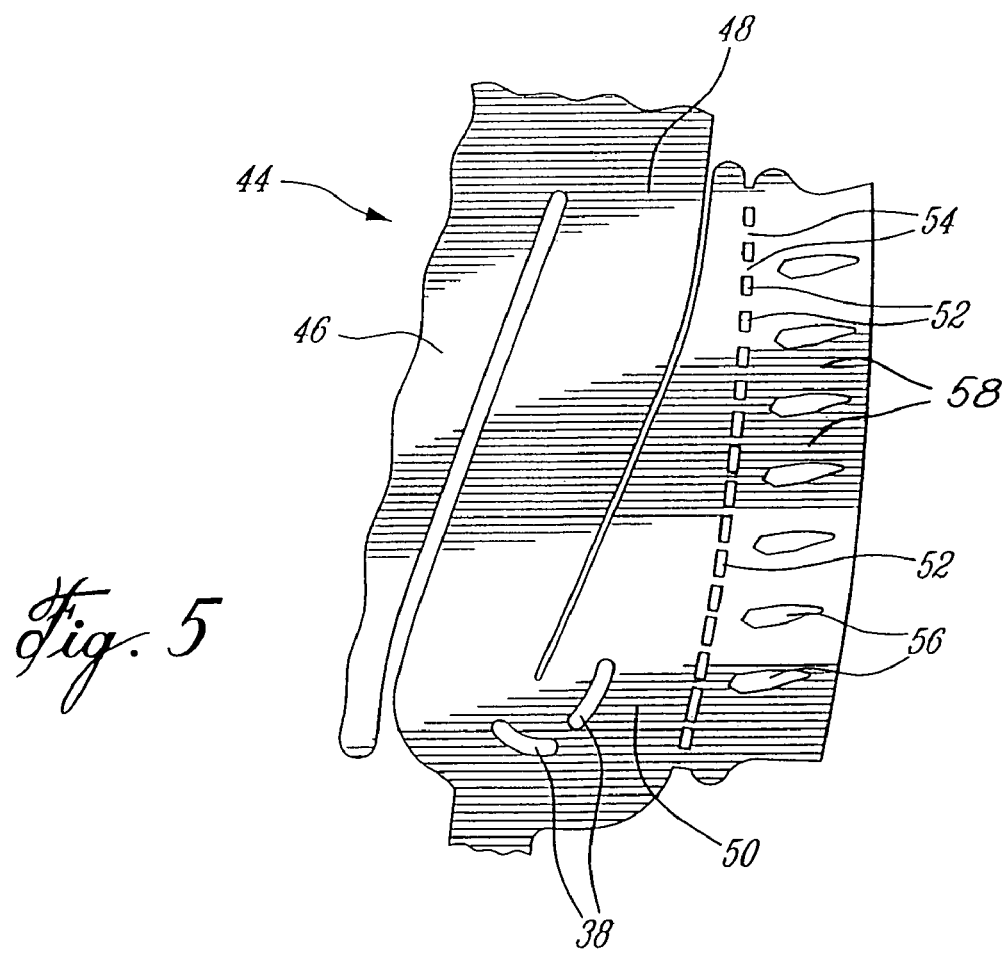
FIG. 5 is a 3-D view of a casting core used to form the inner geometry of the airfoil shown in FIG. 2.

The airfoil 20 and the ribs 40 thereof are preferably cast as a one piece body through the use a ceramic core, such as the one identified by numeral 44 in FIG. 5. This permits flexibility in design by providing overall flow exit control upstream of the exit apertures 36 without any insert or added feature, which results in weight savings.

As well known in the art, the casting of the airfoil 20 can be effected by pouring a molten material within a mold about a core held in position within an outer casting shell. The geometry of the outer shell reflects the general shape of the outer surface of the airfoil, whereas the geometry of the core determines the internal geometry of the cast airfoil. The core 44 is in fact the inverse (i.e. a 3-D "negative") of the internal structure of the airfoil 20. After casting, the core 44 is removed by an appropriate core removal technique, leaving a hollow core-shaped internal cavity within the cast airfoil 20.

As shown in FIG. 5, the core 44 includes a solid body formed of a series of laterally spaced-apart fingers 46, 48 and 50 interconnected in a serpentine manner for giving a serpentine configuration to the internal cooling path 32 of the airfoil 20. A row of holes 52 is provided in the rear finger 50 of the core 44 for forming the ribs 40 in the airfoil 20. The holes 52 are separated one from another by a series of ribs 54 corresponding to the orifices 42 in the cast airfoil 20. A plurality of holes 56 are also provided in the rear finger 50 of the core 44 for allowing the formation of the airfoil pedestal 30. The holes 56 are separated from one another by a series of ribs 58. The ribs 54 are smaller in size than the ribs 58 to provide orifices 42 with a smaller cross-sectional area than that of the exit apertures 36. As can be seen from FIG. 5, the size of the ribs 54 generally increases in a direction away from the lower end of the trailing edge finger 50. This results in orifices 42 of greater cross-sectional area in the distal end portion of the trailing edge segment of the cooling flow path, where the flow restriction requirement are less important, since it is in less direct flow communication with the cooling air supply. Finally, a pair of spaced-apart curved slots 58 are defined through the core 44 as for instance in the interconnecting end portion between the middle finger 48 and the rear finger 50 for allowing the formation of trip strips and air guide features. It is understood that other holes can be provided in the core 44 to provide for the formation of integral heat exchange promoting structures.

The above description is meant to be exemplary only, and one skilled in the art will recognize that changes may be made to the embodiments described without departing from the scope of the invention disclosed. For instance, it is understood that the present invention is not limited to turbine blades or turbine vanes but can rather be applied to other types of internally cooled airfoil structures. It is also understood that the present invention is not limited to the use of the above described casting techniques and that other manufacturing methods are contemplated as well. Still other modifications which fall within the scope of the present invention will be apparent to those skilled in the art, in light of a review of this disclosure, and such modifications are intended to fall within the equivalents accorded to the appended claims.

We claim:

1. An airfoil for a gas turbine engine, the airfoil comprising an airfoil body having an internal cooling path, at least one exit aperture through which cooling air leaves the airfoil, and at least one flow metering orifice defined upstream of the at least one exit aperture, the cooling air passing through the at least one flow metering orifice before leaving through the at least one exit aperture, the at least one flow metering orifice being sized to meter the cooling air passing theretbrough to obtain a desired flow, the at least one exit aperture being sized such as to let the desired flow therethrough and out of the airfoil without restriction, wherein the at least one flow metering orifice includes a plurality of metering orifices having a first total cross-section, the at least one exit apertures includes a plurality of exit apertures having a second total cross-section larger than the first total cross-section, and a number of flow metering orifices being at least twice as large as a number of exit apertures.

2. The airfoil as defined in claim 1, wherein said flow metering orifice is disposed in a rib extending integrally from a first inner face of the airfoil to an opposite second inner face thereof.

3. The airfoil as defined in claim 2, wherein said at least one metering orifice comprises a plurality of orifices along said rib.

4. The airfoil as defined in claim 2, wherein said rib substantially blocks the internal cooling path immediately upstream of said at least one exit aperture, but for said orifice.

5. The airfoil as defined in claim 4, wherein said rib is divided in a plurality of rib segments co-operating to define a plurality of said metering orifices.

6. The airfoil as defined in claim 5, wherein said metering orifices vary in size from one end of the airfoil to another end thereof.

7. The airfoil as defined in claim 1, wherein the flaw metering structure and the airfoil body are cast as a unitary piece.

8. The airfoil as defined in claim 6, wherein the metering orifices are arranged in order of ascending size from one end of the airfoil to another end thereof.

9. A cooled gas turbine engine airfoil comprising a hollow body defining an internal cooling path through which a cooling fluid is circulated to convectively cool the airfoil, at least one exit aperture through which the cooling fluid leaves the airfoil, the flow of cooling fluid leaving the airfoil being metered by a series of metering orifices defined in a rib structure extending across the cooling path immediately upstream of said at least one exit aperture, the size of the metering orifices relative to said at least one exit aperture being such that said at least one exit aperture plays no metering role on the flow of cooling air flowing therethrough, wherein the rib structure and the hollow body are of unitary construction.

10. The airfoil as defined in claim 9, wherein the metering orifices are sized to be smaller than said at least one exit aperture.

11. The airfoil as defined in claim 9, wherein said rib structure is divided in a plurality of rib segments, each pair of adjacent rib segments defining a said metering orifice.

12. The airfoil as defined in claim 9, wherein said metering orifices have different cross-sectional flow area relative to one another.

13. A casting core for use in the manufacturing of a hollow gas turbine engine airfoil, comprising a solid body adapted to be used for forming an internal geometry of an airfoil having an internal cooling path, a row of primary apertures defined through said solid body, each pair of adjacent primary apertures being spaced by a primary rib forming a corresponding metering aperture in the gas turbine engine airfoil, and a row of secondary apertures through said solid body, each pair of adjacent secondary apertures being spaced by a secondary rib forming a corresponding exit aperture in a trailing edge region of the gas turbine engine airfoil, and wherein the primary ribs are smaller in size than said secondary ribs and said primary ribs are immediately upstream of said secondary ribs, wherein the size of the primary ribs vary depending of the locations thereof along the row of primary apertures.

14. The casting core as defined in claim 13, wherein said solid body includes a trailing edge finger forming a trailing edge passage in the gas turbine engine airfoil, and wherein said rows of primary and secondary apertures are defined in said trailing edge finger and substantially parallel to one another.

15. A method of making an internally cooled airfoil, comprising the steps of: providing an airfoil having an internal cooling path terminating in at least one exit aperture, sizing said exit aperture to permit satisfactory manufacturability, providing a metering rib immediately upstream of the exit aperture with at least one orifice defined therein, siring the at least one orifice to restrict the flow delivered to the at least one exit aperture to thereby meter the overall airflow exiting the airfoil irrespective of the size of the at least one exit aperture.

16. An airfoil for a gas turbine engine, the airfoil comprising an airfoil body having an internal cooling path, at least one exit aperture through which cooling air leaves the airfoil, and at least one flow metering orifice defined upstream of the at least one exit aperture, the cooling air passing through the at least one flow metering orifice before leaving through the at least one exit aperture, the at least one flow metering orifice being sized to meter the cooling air passing therethrough to obtain a desired flow, the at least one exit aperture being sized such as to let the desired flow therethrough and out of the airfoil without restriction, wherein said flow metering orifice is disposed in a rib extending integrally from a first inner face of the airfoil to an opposite second inner face thereof.

* * * * *

UNITED STATES PATENT AND TRADEMARK OFFICE
CERTIFICATE OF CORRECTION

PATENT NO. : 7,278,826 B2
APPLICATION NO. : 10/920374
DATED : October 9, 2007
INVENTOR(S) : Timothy Blaskovich, Larry Lebel and Ricardo Trindade It is certified that error appears in the above-identified patent and that said Letters Patent is hereby corrected as shown below:

claim 1, column 4, line 44, delete "theretbrough" insert --therethrough--;

claim 7, column 5, line 4, delete "flaw" insert --flow--;

claim 15, column 6, line 21, delete "siring" insert --sizing--.

Signed and Sealed this

Twenty-fifth Day of December, 2007

JON W. DUDAS
*Director of the United States Patent and Trademark Office*